United States Patent [19]
Johnson, Jr.

[11] 3,876,009
[45] Apr. 8, 1975

[54] FIRE EXTINGUISHING APPARATUS

[76] Inventor: Wilber O. Johnson, Jr., 3310 Gary Ln., Houston, Tex. 77373

[22] Filed: Oct. 9, 1973

[21] Appl. No.: 404,166

Related U.S. Application Data

[63] Continuation-in-part of Ser. No. 221,515, Jan. 28, 1972, abandoned.

[52] U.S. Cl. .................. 169/24; 73/212; 169/13
[51] Int. Cl. ............................................ A62c 27/18
[58] Field of Search ................ 169/2 R, 5, 13, 24; 73/198, 205 R, 211, 212, 228, 182

[56] References Cited
UNITED STATES PATENTS

| | | | |
|---|---|---|---|
| 2,325,355 | 7/1943 | Yost | 169/24 |
| 2,694,454 | 11/1954 | Eickmeyer | 169/13 |
| 3,349,615 | 10/1967 | Finkl | 73/182 |
| 3,581,565 | 6/1971 | Dieterich | 73/212 |
| 3,678,754 | 7/1972 | Amir et al | 73/212 X |
| 3,683,693 | 8/1972 | Brown | 73/212 |

Primary Examiner—M. Henson Wood, Jr.
Assistant Examiner—Michael Mar
Attorney, Agent, or Firm—John Paul Robinson, Jr.

[57] ABSTRACT

A fire-extinguishing assembly having a source of pressurized fire-extinguishing fluid. The discharge of said pressurized fluid source operatively associated with a flow measuring and indicating means which includes a means for directly indicating the quantity of fluid flow in gallons or liters or any other suitable units of volume with respect to time; for example, gallons per minute. Said flow indicating and measuring means including means for detecting a signal which is a function of the fluid velocity and converting said signal into suitable units of volume with respect to time.

4 Claims, 4 Drawing Figures

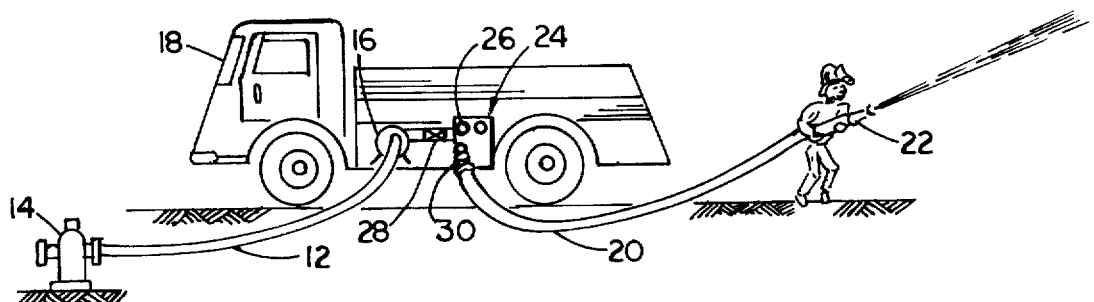
FIG. I
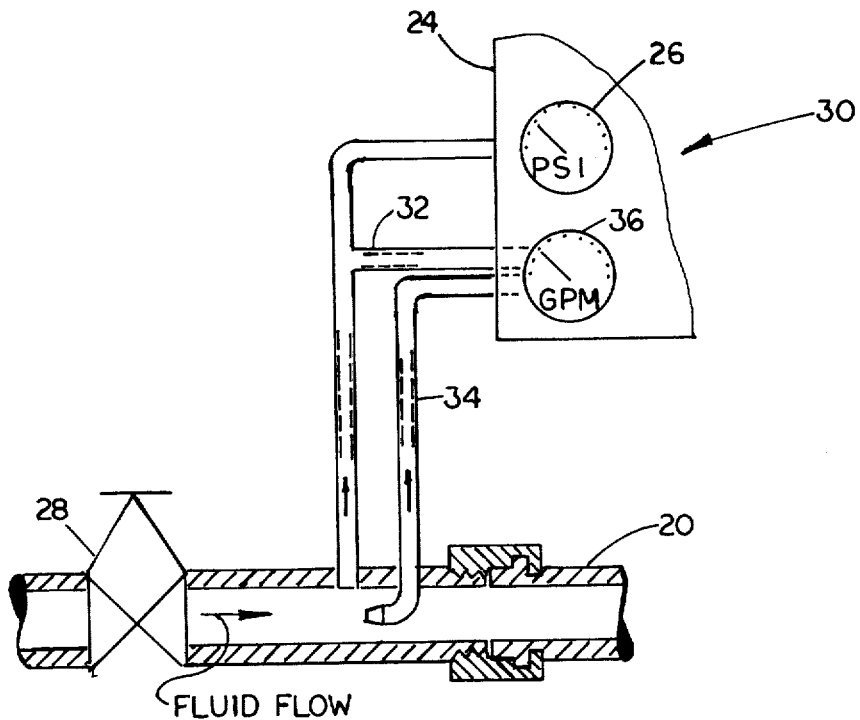
FIG. II
INVENTOR:
WILBER O. JOHNSON JR.
ATTORNEY:
John Paul Robinson Jr.

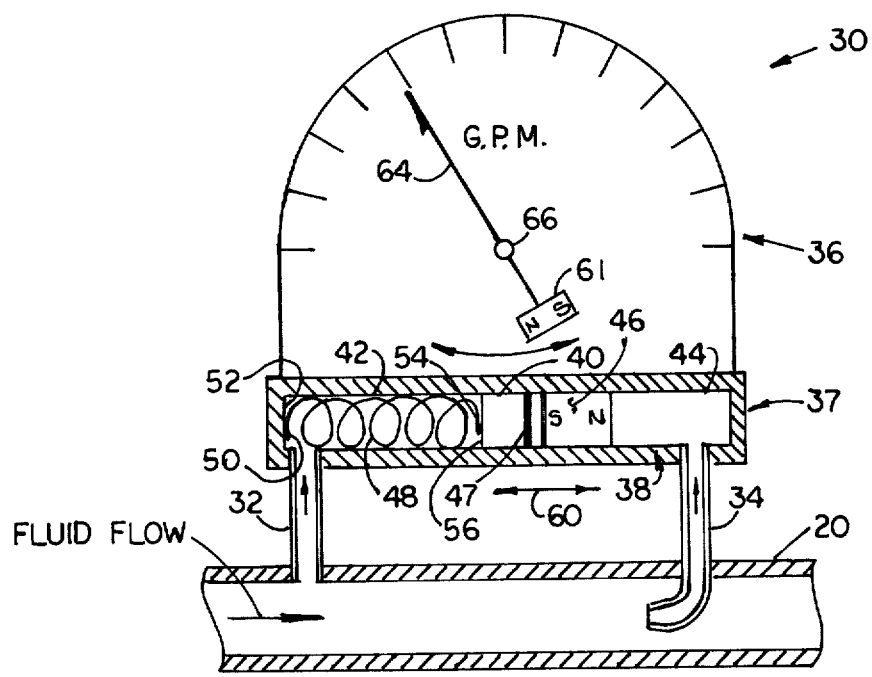
FIG. III
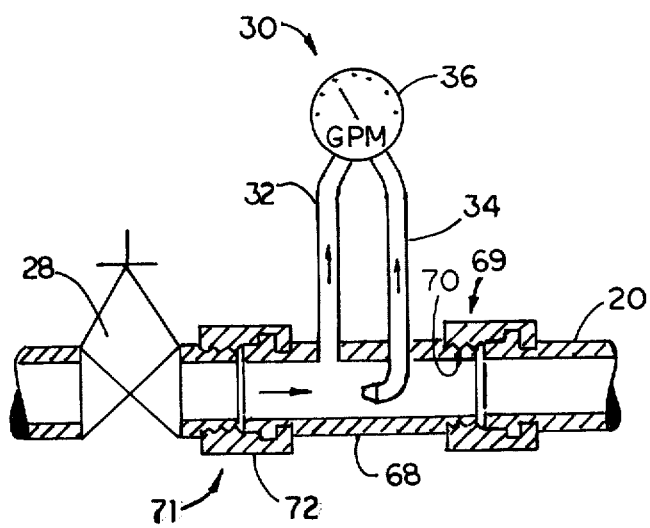
FIG. IV

FIRE EXTINGUISHING APPARATUS

CROSS-REFERENCE TO RELATED APPLICATION

This application is a continuation-in-part of my previously filed application, Ser. No. 221,515; filed Jan. 28, 1972 now abandoned and incorporates by reference all of the subject matter of that previously filed application.

The invention relates to a fire-extinguishing assembly and more particularly to an assembly for measuring and indicating in gallons or liters per minute the quantity of fire extinguishing fluid delivered to the nozzle.

The following U.S. Pat. Nos. were garnered in a search of the prior art: (1) 1,041,470 to J. A. Hiller; (2) 2,325,355 to C. F. Yost; (3) 3,425,280 to M. J. Foster; (4) 3,429,291 to L. J. Hoffman. In addition, to the above, applicant discovered the following representative art: (1) "Operating Fire Department Pumpers" a book published by the National Fire Protection Association; (2) "Standard No. 19 Automotive Fire Apparatus" also published by the National Fire Protection Association.

In the past, continuous and expensive efforts have been expended to develop a satisfactory, rugged, and reliable apparatus for measuring the pressure of fluid which is discharged from a pump mounted on a fire extinguishing vehicle, or from some other conventional pressure source. Some of these previous pressure measuring and indicating devices are disposed in a fluid conduit and included a pressure gage. Several presistant defects and/or problems, however, are associated with these fluid pressure measuring devices. For example, the aforementioned fluid pressure devices measure and/or indicate fluid pressure (in pounds per square inch) within a conduit which contains fluid. Thus, the discharge rate of fluid flow (gallons per minute or some other suitable unit of volume) from the fire water pump or other source of pressurized water supply must be calculated, either mentally or by utilization of a prepared graph or chart. Such calculations are difficult to prepare under everyday operating conditions and the excitement, confusion, haste, and tension encountered during a fire results in such calculations being virtually impossible to make. The most that can be said for the above noted pressure measuring devices is that they indicate a fluid line pressure. There is, generally, not enough time for the pump operator to make the calculations that are required to convert the pressure readings (pounds per square inch) into gallons or liters per minute and this causes extreme variations in the efficiency of the fire extinguishing fluid stream which is emitted from a conventional nozzle. Such calculations, as noted above, are based on Bernoulli's Theorem and the following variable factors must be considered by the pump operator: (1) Internal diameter of the hose; (2) Length of hose; (3) Type of nozzle; (4) Elevation of nozzle above the pump; and other factors too numerous to mention. In fact, many times during a fire the nozzle dispensing the fire extinguishing water is not visible to the pump operator and he must make a guess to the height or elevation of said nozzle above the pump. Therefore, it is obvious such a system is extremely inefficient and difficult to operate. Furthermore, excessive fluid flow will cause a corresponding increase in the nozzle reaction and this could be very dangerous and result in injury to the men handling and directing the nozzle. Even with the above enumerated deficiencies of the conventional pressure gage calculation-type of fluid flow measuring system, which has been in fire service hydraulics since John R. Freeman published his flow tables in 1895, it has not been obvious to replace this inefficient method with a direct indicating fluid flow meter as described in the present application.

Accordingly, a major object of the present invention is the provision of a new and improved fire extinguishing apparatus which is reliable in operation, simple to fabricate, and is arranged to allow the operator to provide proper water flow to fire extinguishing nozzles without having to make calculations and without knowledge of hose length and elevation of nozzles.

Another object of the present invention is to provide a fire extinguishing assembly with a flow meter which measures and indicates in volumetric units per unit of time the quantity of fire extinguishing fluid flowing therethrough.

A further object of the present invention is to provide a fluid flow meter which is economical to construct and because of its compactness and simplicity of design has a field of its own.

Other objects and purposes of this invention will be apparent to persons acquainted with fire extinguishing apparatus of this general type upon reading the following specification in conjunction with the accompanying drawing.

IN THE DRAWING

FIG. I is a side elevation showing the fire extinguishing assembly according to the invention.

FIG. II is a cross-sectional view illustrating the control mechanism of the present inventive concept.

FIG. III is a cross-sectional view disclosing one type of fluid flow meter of the present invention.

FIG. IV is a cross-sectional view showing an alternate embodiment of the control mechanism of the invention.

For the purpose of disclosure of the new and unobvious fire extinguishing assembly which includes a flow measuring and indicating device that senses and indicates the volume of fluid flow in gallons per minute, embodying the present invention, reference is now made in greater detail to the drawing wherein like numerals indicate similar parts or portions throughout the several views. FIG. I illustrates how the present inventive concept can be utilized with a conventional fire extinguishing pumper vehicle. A fire hose and/or second fluid conduit means 12 is connected at one end to a fire hydrant 14 or some other source of pressurized fire extinguishing fluid and on the other end to a pump 16 mounted on pumper vehicle 18. A conventional drive mechanism (not shown) can be used to drivingly interconnect the engine of pumper 18 to pump 16, however, other means to drive pump 16 can be employed. The pump 16 discharges water or some other fire extinguishing fluid through another hose and/or first fluid conduit means 20 and nozzle 22 which is directed toward a fire. A control panel 24 is mounted on pumper 18 and a pressure gage which is used for reference only is disposed thereon and communicates with hose or second fluid conduit means 20 for indicating the static head of the fluid within hose 20. A manually actuable flow control valve 28 is positioned in conduit 20 near the discharge of pump 16 and adjacent panel 24. Thus, the pump operator is able to control the quantity of fluid flowing through conduit means 20 by adjustment on valve 28. In the past, this manual adjustment or operation of valve 28 has been a matter of calculated guesswork on the part of the pump operator and the results, of such operation have been inconsistent. To the above described conventional arrangement a fluid flow measuring and indicating means 30, as shown in FIG. II, includes a first and a second tube 32, 34 extending through the outer shell or wall of conduit means 20 and into the fluid stream within. The first tube 32 senses the static head or pressure of the fluid stream and the second tube 34 senses the velocity head of the stream. The horizontal portion of tube 34 (FIG. II, III & IV) is inserted through the wall of a pipe spool, which forms a portion of first fluid conduit means 20, and is accurately positioned substantially parallel to the axis of said pipe spool; thus, the horizontal portion of tube 34 is substantially parallel to the moving stream of fluid being handled, with the open end of said horizontal portion FIG. III, facing upstream toward the flow. The tube 32 (FIG. II, III & IV) is connected through the pipe wall substantially normal or 90° to the stream flow. The horizontal portion of tube 34 is positioned substantially at the center of the first fluid conduit means 20 for measuring the velocity head of the fluid steam therein. It has been determined that the area immediately surrounding the center point of the pipe is the best location for the opening of the pitot tube; for example the circular area defined by a radius equal to 0.20 R (where R is equal to the internal radius of the pipe) measured from the center point of the pipe will give reasonably accurate readings. FIG. III discloses the differential-pressure indicator 30 used to measure and indicate on dial 36 the desired units of volume with respect to time, for example, gallons per minute being discharged from nozzle 22. The differential-pressure gage or indicator 30, shown in FIG. III, comprises a housing 37 having an inner annular chamber portion 38 that is divided by reciprocating piston member 40 into annular chambers 42, 44. A magnet 46 is fixedly secured to one end of piston 40 for simultaneous movement therewith; and magnet 46 has substantially the same geometric configuration as piston 40. Piston 40 has an elongate body with its geometric axis substantially aligned and coincident with the axis of chambers 42, 44. A fluid seal 47 in the form of an "O" ring or some other suitable seal can be placed about the outer surface of piston 40 to effectively seal chamber 42 from chamber 44. A spring or biasing member 48 is disposed within chamber 42 and has one end 50 bearing against end wall 52 while the opposite end 54 bears against a working surface 56 of piston 40 to bias piston 40 and magnet 46 toward chamber 44. The static head or pressure in conduit means 20 communicates with chamber 42 through tube 32 and the velocity head in conduit means 20 communicates with chamber 44 through tube 34. Thus, any change in pressure within one or both of chambers 42, 44 will cause piston 40 and magnet 46 to move in one or another direction as indicated by double headed arrow 60 until as equilibrium is established between the pressure difference in chambers 42, 44 and biasing spring 48. A small magnet 61 is secured by suitable means to pointer 64 that From about point description, Magnets 61, 46 are positioned and arranged with like poles in a substantially opposed and aligned relationship for exerting a force therebetween; such that, movement of piston 40 and magnet 46 within chamber portion 38 causes a pivotal movement of pointer 64.

FIG. IV illustrates another embodiment of the present inventive concept wherein the present flow meter 30, which indicates gallons per minute, is mounted on a short length of two and one-half inch diameter pipe member 68 which has a quick acting coupling 69 with a male coupling portion 70 on one end and a quick acting coupling 71 having a female connection 72 on the other end. This structure enables the flow meter 30 to be utilized on existing fire fighting equipment without making any expensive modification thereto. From the above desription, it is readily apparent that additional advantages reside in this unique fire extinguishing apparatus. The differential pressure flow meter 30 is inexpensive to manufacture; the length of hose and elevation of the discharge nozzle above the pump no longer concerns the pump operator; the pump operator is no longer required to worry about and make fluid friction loss calculations. The pump operator must merely adjust control valve 28 to the proper flow rate, in gallons per minute as indicated by indicator 36, to a particular type of nozzle and the resulting flow and nozzle pressure will be correct. Line burst is indicated by a sudden increase in flow accompanied by a decrease in pump pressure. Closure or shut-off of the discharge nozzle 22 is indicated by a zero flow reading on indicator 36 accompanied by an increase in pump pressure as indicated by gage 26. Excessive lay is indicated by low flow rate accompanied by excessive pump pressure.

To reiterate, the problem to be solved is the pump operator is required to make hydraulic calculations based on: (1) the size of the hose, (2) length of the hose, (3) plus the elevation of the nozzle above grade. Applicant has solved the above noted problem. It is a known fact that within ordinary ranges of pressure and temperature water for all practical purposes will, only slightly, compress or decrease in volume. Thus, fluid flow discharged from nozzle 22 is equal to the flow throughout the entire length of the system. It is a well known fact that a nozzle tip of predetermined size develops a pressure proportional to the quantity of fluid flowing therethrough. Thus, the quantity of fluid flowing through the discharge nozzle and the resultant nozzle pressure can be controlled by regulating the fluid flow at the pumps. Accordingly, if the proper quantity of fluid is directed toward and into a pipe or hose to supply a particular nozzle of predetermined geometric configuration and size the gallons per minute discharged and the corresponding nozzle pressure will be that which is desired.

In addition, flowmeters for fire fighting service must meet special requirements not required for conventional flowmeters, such as: (1) Must stand a minimum hydrostatic pressure of 600 pounds per square inch gage; (2) Must be able to function properly in a stream of water containing the usual debris, such as pea gravel, stones, sand and grit; (3) Must be inexpensive enough to be available to fire fighting departments with small budgets; (4) The space between the pump housing and side-wall panels of the fire pumper vehicle is approximately 2 to 4 inches and the fluid flow detector and indicator should fit within these dimensional limits.

It is readily apparent, after a review of the aforementioned requirements, that the pitot-type flow meter of the present inventive concept is the only acceptable type of velocity head detector that is suitable.

While the invention has been shown, illustrated, described and disclosed in terms of embodiments or modifications which it has assumed in practice, the scope of the invention should not be deemed to be limited by the precise embodiment or modification therein shown, illustrated, described or disclosed; such other embodiments or modifications intended to be reserved especially as they fall within the scope of the claims here appended.

What is claimed is:

1. A portable fire extinguishing assembly in combination:
    a self-propelled fire extinguishing pumper-type vehicle which is utilized to assist firemen in extinguishing a fire;
    a first fluid conduit means communicating with and having one end connected to pressurized fire extinguishing fluid means and the other end of said fluid conduit connected to and communicating with a fluid conduit nozzle which directs the flow of the extinguishing fluid therethrough, said pressurized fluid means including pump means carried by and mounted on the pumper-type vehicle;
    said pump means having a discharge opening interconnected to said first fluid conduit means and a suction opening adapted to be operatively connected through a second fluid conduit means to a source of fire extinguishing fluid;
    a fire extinguishing pitot-type fluid flow measuring and indicating means, for eliminating the need for the pump operator to mentally calculate all head loss due to friction between the fire extinguishing fluid and the side-walls of the first fluid conduit means and the difference in elevation between the discharge of the pump means and the fluid discharge nozzle, operatively connected to and communicates with the interior of the first fluid conduit means and including means for simultaneously measuring the static head and the velocity head of the fluid flowing through said first conduit means, said velocity head being taken at substantially the center of said first fluid conduit means, and means for comparing the static head with the velocity head to obtain a resultant pressure signal, said indicating means responsive to said signal for visually indicating the flow rate in units of volume with respect to time the quantity of fire extinguishing fluid flowing through the conduit means, thereby eliminating the need for firemen to calculate the head loss in the system; and
    the fluid flow measuring and indicating means includes a pivotal element which pivots about a point, one end of said element cooperates with means for visually indicating the quantity of fluid in units of volume with respect to time and the opposite end has a magnet secured thereto, another magnet is disposed on a piston member which moves in at least one direction in response to sensing a pressure difference between the static head and the velocity head of the fire extinguishing fluid flow, and at least one magnet pole of the magnet carried by the opposite end of the pivotal element is disposed in a substantially aligned and opposed relationship with at least one magnet pole of like polarity on the another magnet carried by the piston member for exerting a repelling force therebetween.

2. A portable fire extinguishing assembly in combination:
    a self-propelled fire extinguishing pumper-type vehicle which is utilized to assist firemen in extinguishing a fire;
    a first fluid conduit means communicating with and having one end connected to pressurized fire extinguishing fluid means and the other end of said fluid conduit connected to and communicating with a fluid conduit nozzle which directs the flow of the extinguishing fluid therethrough, said pressurized fluid means including pump means carried by and mounted on the pumper-type vehicle;
    said pump means having a discharge opening interconnected to said first fluid conduit means and a suction opening adapted to be operatively connected through a second fluid conduit means to a source of fire extinguishing fluid;
    a fire extinguishing pitot-type fluid flow measuring and indicating means, for eliminating the need for the pump operator to mentally calculate all head loss due to friction between the fire extinguishing fluid and the side-walls of the first fluid conduit means and the difference in elevation between the discharge of the pump means and the fluid discharge nozzle, operatively connected to and communicates with the interior of the first fluid conduit means and including means for simultaneously measuring the static head and the velocity head of the fluid flowing through said first conduit means, said velocity head being taken at substantially the center of said first fluid conduit means, and means for comparing the static head with the velocity head to obtain a resultant signal, said indicating means responsive to said signal for visually indicating the flow rate in units of volume with respect to time the quantity of fire extinguishing fluid flowing through the conduit means, thereby eliminating the need for firemen to calculate the head loss in the system.

3. The fire extinguishing assembly recited in claim 2, wherein the fluid flow measuring and indicating means includes a pipe member having a two and one-half inch diameter, female, quick disconnect coupling portion disposed adjacent one end and a two and one-half inch diameter male quick disconnect coupling portion disposed adjacent the other end, said pitot-type flow measuring and indicating means carried by and communicating with the interior of said pipe member.

4. The fire extinguishing assembly recited in claim 3, wherein the means for measuring the velocity head is disposed within a circular area about the center point of the first fluid conduit means, said circular area being defined by a radius equal to 0.20 R where R is equal to the internal radius of the first fluid conduit means, said first fluid conduit means having the geometric cross-section of a circle.

* * * * *